(12) United States Patent
Barbat et al.

(10) Patent No.: US 10,391,970 B2
(45) Date of Patent: Aug. 27, 2019

(54) SEAT BELT ASSEMBLY

(71) Applicant: Ford Global Technologies, LLC, Dearborn, MI (US)

(72) Inventors: Saeed David Barbat, Novi, MI (US); Dean M. Jaradi, Macomb, MI (US); S. M. Iskander Farooq, Novi, MI (US); Mohammed Omar Faruque, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/348,632

(22) Filed: Nov. 10, 2016

(65) Prior Publication Data

US 2018/0126947 A1     May 10, 2018

(51) Int. Cl.
*B60N 2/14*     (2006.01)
*B60N 2/809*     (2018.01)
*B60R 22/26*     (2006.01)
*B60R 22/34*     (2006.01)
*B60R 22/20*     (2006.01)
*B60R 22/18*     (2006.01)
*B60R 22/02*     (2006.01)

(52) U.S. Cl.
CPC .............. *B60R 22/26* (2013.01); *B60N 2/14* (2013.01); *B60N 2/809* (2018.02); *B60R 22/20* (2013.01); *B60R 22/34* (2013.01); *B60R 2022/027* (2013.01); *B60R 2022/1831* (2013.01); *B60R 2022/263* (2013.01); *B60R 2022/266* (2013.01); *B60R 2022/3402* (2013.01)

(58) Field of Classification Search
CPC .......... B60N 2/888; B60N 2/80; B60N 2/879; B60N 2/809; B60N 2/14; B60R 22/00; B60R 22/26; B60R 22/34; B60R 2022/027; B60R 2022/1831; B60R 22/20
USPC ................................... 297/484, 336
See application file for complete search history.

(56) References Cited

U.S. PATENT DOCUMENTS 5,123,673 A * 6/1992 Tame ...................... B60R 22/03
                                                  100/268
5,466,043 A    11/1995 Lambert et al.
(Continued)

FOREIGN PATENT DOCUMENTS

AU      2009100865 A4    10/2009
CN      201227981 Y      4/2009
(Continued)

OTHER PUBLICATIONS

UK Search Report dated Apr. 9, 2018 re GB Appl. 1718401.1.

*Primary Examiner* — Milton Nelson, Jr.
(74) *Attorney, Agent, or Firm* — Frank A. MacKenzie; Bejin Bieneman PLC (57) ABSTRACT

A seat assembly includes a seat back and a headrest adjustably coupled to the seat back. The headrest defines a first guide passage and a second guide passage, each extending through the headrest. The seat assembly includes a retractor and a belt. The belt extends continuously from a first end to a second end. The first end is engaged with the retractor. The belt has a looped portion from the first guide passage to the second guide passage. The belt extends from the looped portion through the first guide passage to the first end, and extends from the looped portion through the second guide passage to the second end.

20 Claims, 9 Drawing Sheets

(56) References Cited

U.S. PATENT DOCUMENTS

| | | | | |
|---|---|---|---|---|
| 5,580,126 | A | * | 12/1996 | Sedlack ................. B60N 2/265 297/250.1 |
| 5,662,368 | A | * | 9/1997 | Ito ...................... B60N 2/01583 296/65.05 |
| 6,139,111 | A | | 10/2000 | Pywell et al. |
| 6,986,548 | B2 | * | 1/2006 | Jane Santamaria .. B60N 2/2803 297/250.1 |
| 7,625,048 | B2 | | 12/2009 | Rouhana et al. |
| 9,073,574 | B2 | | 7/2015 | Cuddihy et al. |
| 9,254,767 | B1 | | 2/2016 | Tuman, II et al. |
| 2002/0089163 | A1 | | 7/2002 | Bedewi et al. |
| 2017/0232929 | A1 | * | 8/2017 | McGovern ........... B64D 11/062 297/411.1 |

FOREIGN PATENT DOCUMENTS

| | | |
|---|---|---|
| DE | 102009058010 A1 | 6/2011 |
| DE | 102010015443 A1 | 10/2011 |
| SE | 361015 B | 10/1973 |
| WO | WO 2011128108 A1 | 10/2011 |

* cited by examiner

SEAT BELT ASSEMBLY

BACKGROUND

A seat belt assembly in a vehicle may include at least one belt, at least one retractor, and at least one buckle. The buckle and the retractor are mounted to the vehicle, e.g., a seat or a body of the vehicle. The belt is retractably extendable from the retractor, and the belt is releasably engageable with the buckle, e.g., with a clip slidably engaged with the belt. One type of seat belt assembly is a three-point seat belt assembly, in which the belt engages the seat/body of the vehicle at three points, e.g., the retractor, the buckle, and a fixed connection point. In this instance, the belt may extend from a first end in the retractor to a second end fixed to the fixed connection point, and the clip may be connected to the buckle to create a third point of attachment to the vehicle. Another type of seat belt assembly is a four-point seat belt assembly, in which the belt engages the seat/body of the vehicle at four points, e.g., at two points on opposite shoulders of the seat and at two points on opposite sides of a seat bottom.

DETAILED DESCRIPTION

With reference to the Figures, wherein like numerals indicate like parts throughout the several views, a seat assembly 10 for a vehicle 60 is generally shown. The seat assembly 10 includes a seat back 12 and a headrest 16 adjustably coupled to the seat back 12. The headrest 16 defines a first guide passage 18 and a second guide passage 20, each extending through the headrest 16. The seat assembly 10 includes a retractor 36 and a belt 40. The belt 40 extends continuously from a first end 42 to a second end 44. The first end 42 is engaged with the retractor 36. The belt 40 has a looped portion 46 from the first guide passage 18 to the second guide passage 20. The belt 40 extends from the looped portion 46 through the first guide passage 18 to the first end 42, and extends from the looped portion 46 through the second guide passage 20 to the second end 44.

Figure 3A:
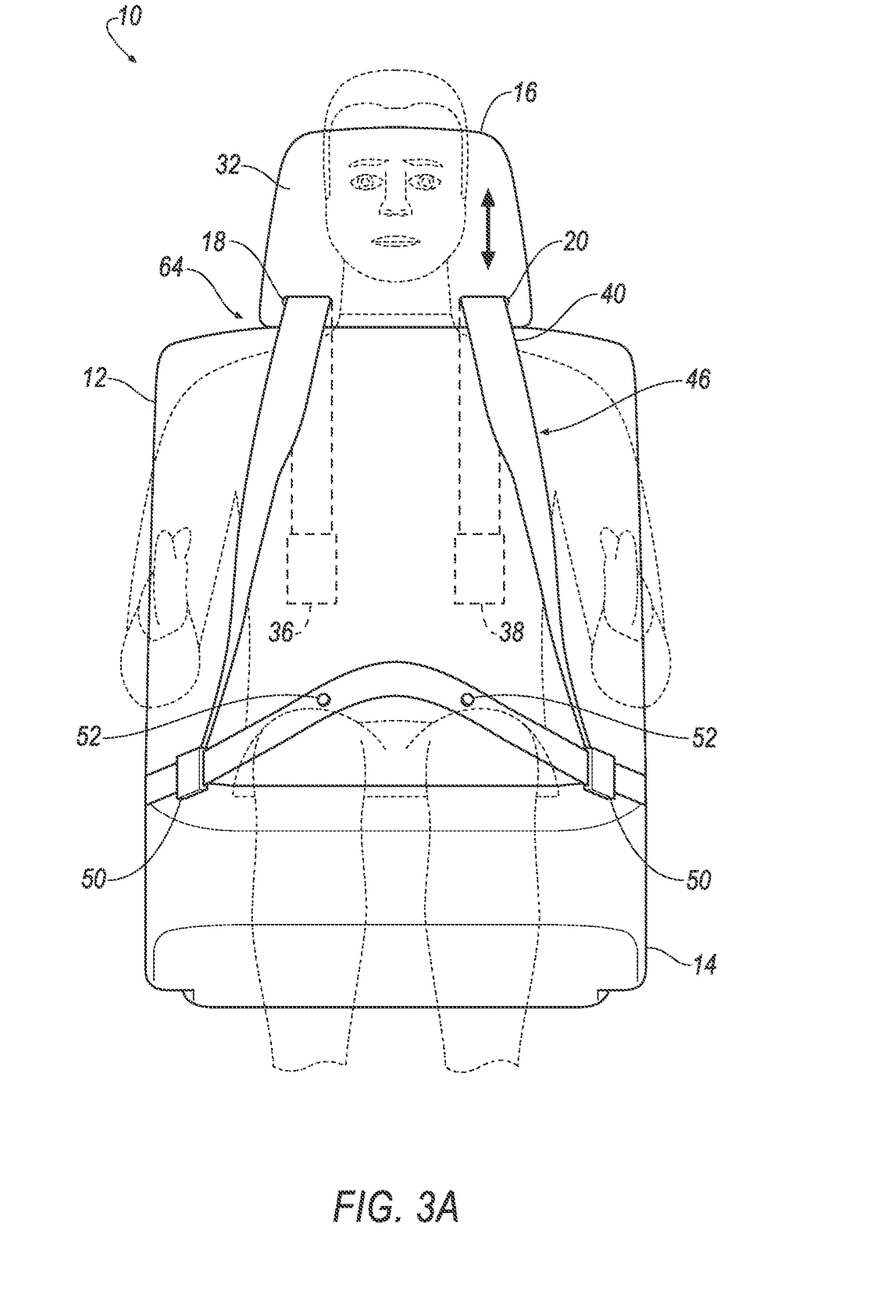
FIG. 3A is a front view of one seat assembly supporting a relatively small occupant and including a headrest in a relatively lowered position and the seat belt assembly in a buckled position.
Figure 3B:
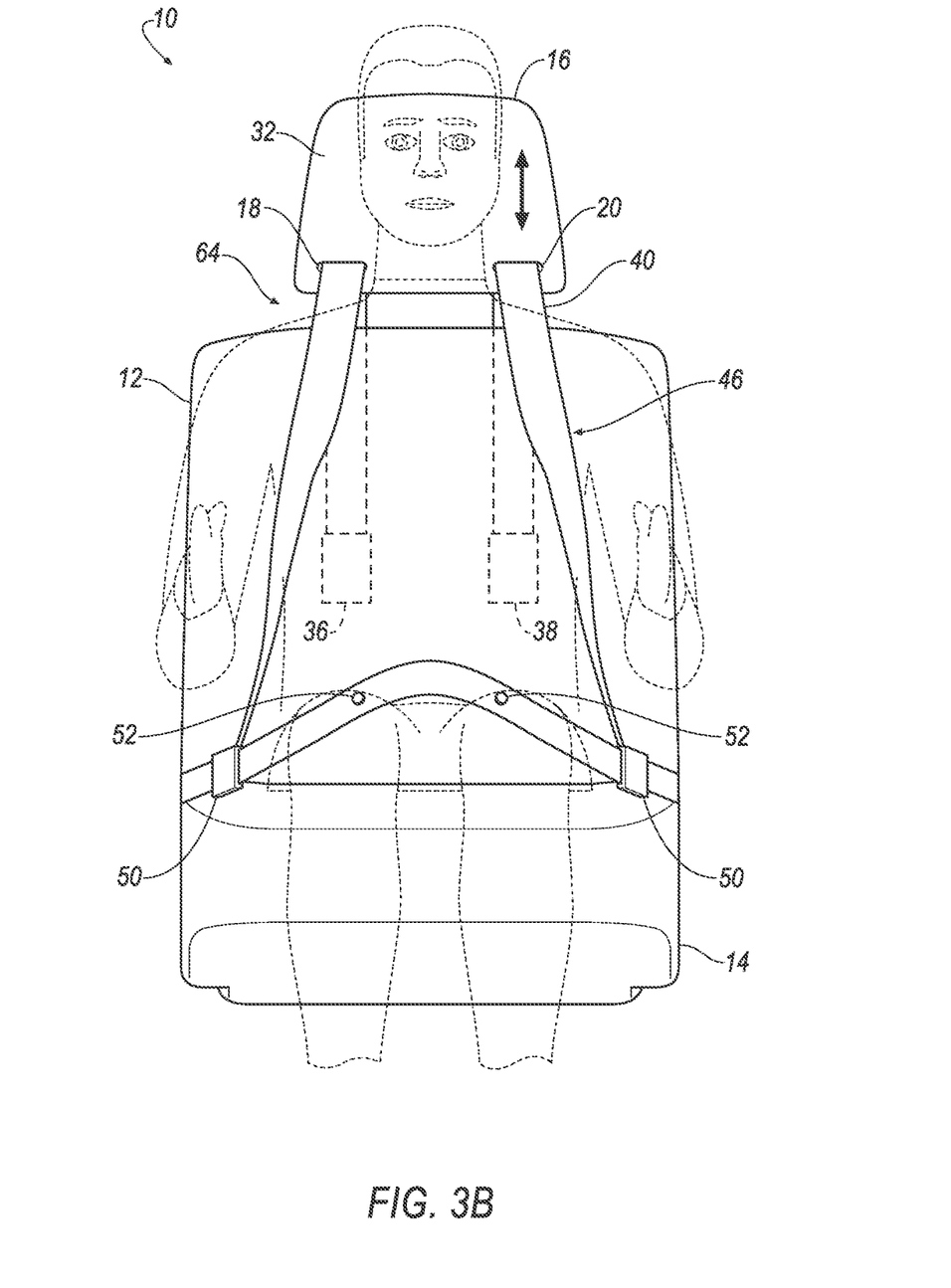
FIG. 3B is a front view of one seat assembly supporting a relatively large occupant and with the headrest in a relatively higher position and the seat belt assembly in the buckled position.

The seat assembly 10 allows for greater adaptability to accommodate a variety of occupants. The headrest 16 is adjustable to increase comfort and desired positioning for occupants ranging in height. For example, the headrest 16 may be lowered relative to the seat back 12 for relatively short occupants, as shown in FIG. 3A, and may be raised relative to the seat back 12 for relatively tall occupants, as shown in FIG. 3B. Additionally, the belt 40 extends continuously from the first end 42 to the second end 44. By being continuous, the belt 40 reduces specific areas of high stress and potential points of failure.

The vehicle 60 may be, for example, any type of passenger automobile. The vehicle 60, for example, may be an autonomous vehicle. The Society of Automotive Engineers (SAE) has defined multiple levels of autonomous vehicle operation. At levels 0-2, a human driver monitors or controls the majority of the driving tasks, often with no help from the vehicle 60. For example, at level 0 ("no automation"), a human driver is responsible for all vehicle operations. At level 1 ("driver assistance"), the vehicle 60 sometimes assists with steering, acceleration, or braking, but the driver is still responsible for the vast majority of the vehicle control. At level 2 ("partial automation"), the vehicle 60 can control steering, acceleration, and braking under certain circumstances without human interaction. At levels 3-5, the vehicle 60 assumes more driving-related tasks. At level 3 ("conditional automation"), the vehicle 60 can handle steering, acceleration, and braking under certain circumstances, as well as monitoring of the driving environment. Level 3 requires the driver to intervene occasionally, however. At level 4 ("high automation"), the vehicle 60 can handle the same tasks as at level 3 but without relying on the driver to intervene in certain driving modes. At level 5 ("full automation"), the vehicle 60 can handle almost all tasks without any driver intervention. The vehicle 60 may operate in one or more of the levels of autonomous vehicle operation.

Figure 1:
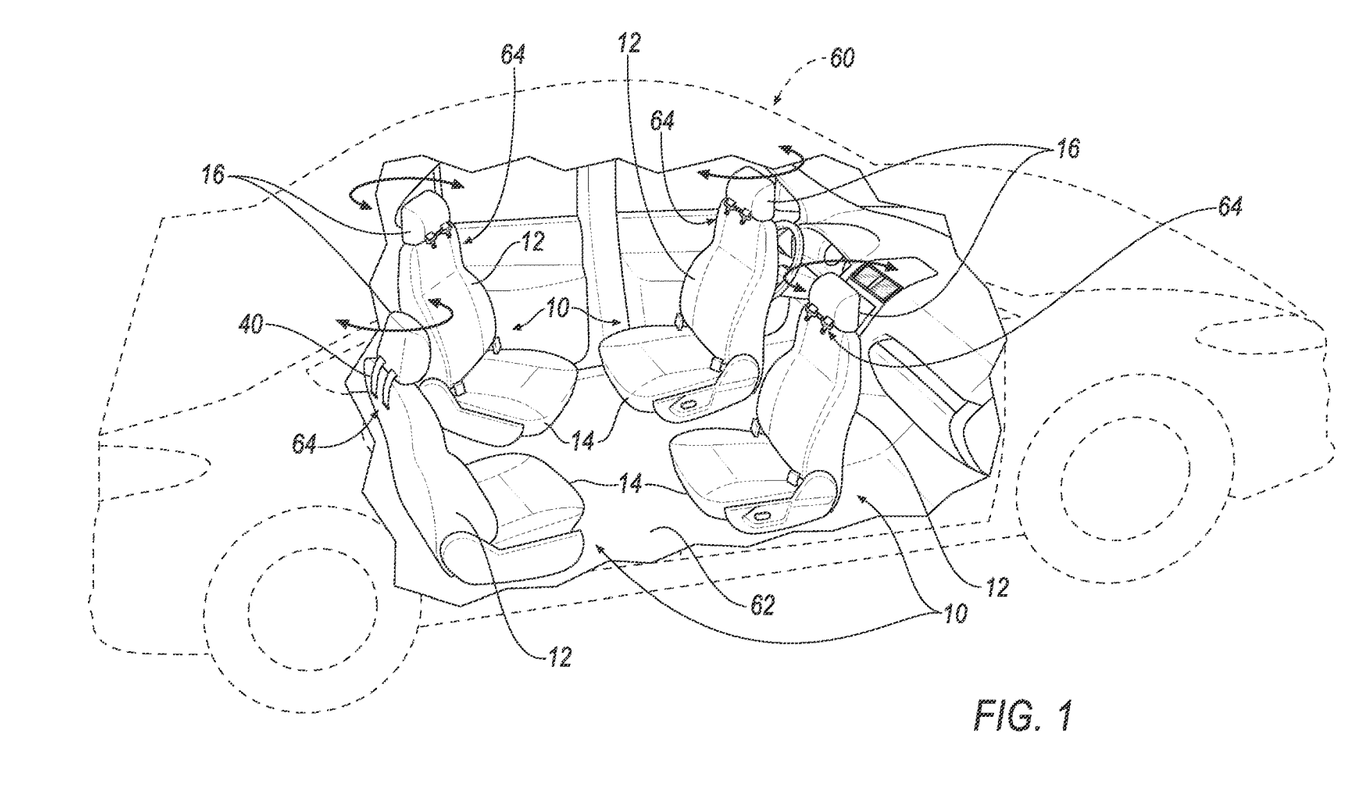
FIG. 1 is a perspective view of a vehicle including four seat assemblies each having a seat belt assembly.

With reference to FIG. 1, the vehicle 60 may include more than one seat assembly 10. For example, the vehicle 60 shown in FIG. 1 includes four seat assemblies 10. Each of these seat assemblies 10 may be identical, or nearly identical, to each other. The seat assemblies 10 may be located at any suitable position in the vehicle 60.

With continued reference to FIG. 1, the vehicle 60 includes a floor 62. The seat assemblies 10 may be supported on the floor 62. At least one of the seat assemblies 10 may be rotatable relative to the floor 62, e.g., about a generally vertical axis. As shown in FIG. 1, each of the seat assemblies 10 are rotatable in 360 degrees relative to the floor 62. As one example, in configurations where the vehicle 60 is autonomous, during autonomous operation of the vehicle 60, the seat assemblies 10 may be rotated to face each other, as shown in FIG. 1, such that the occupants can face each other and interact.

With reference to FIGS. 1 and 3A-3B, the seat assembly 10 includes the seat bottom 14, the seat back 12, the headrest 16, the retractor 36, and the belt 40. The seat bottom 14 supports the seat back 12, and is designed to rotatably connect to the floor 62 of the vehicle 60. For example, the seat bottom 14 may be rotatably coupled to a support member (not shown) that is fixed to the floor 62. As another example, the seat bottom 14 may be fixed to the support member and the support member is rotatably coupled to the floor 62.

The seat back 12 may have a first end (not numbered) adjacent to the seat bottom 14, and a second end (not numbered) spaced from the first end and may be elongated from the first end to the second end. The headrest 16 may be coupled to the second end. The seat back 12 may be rotatable, i.e., reclinable, relative to the seat bottom 14.

Figure 4:
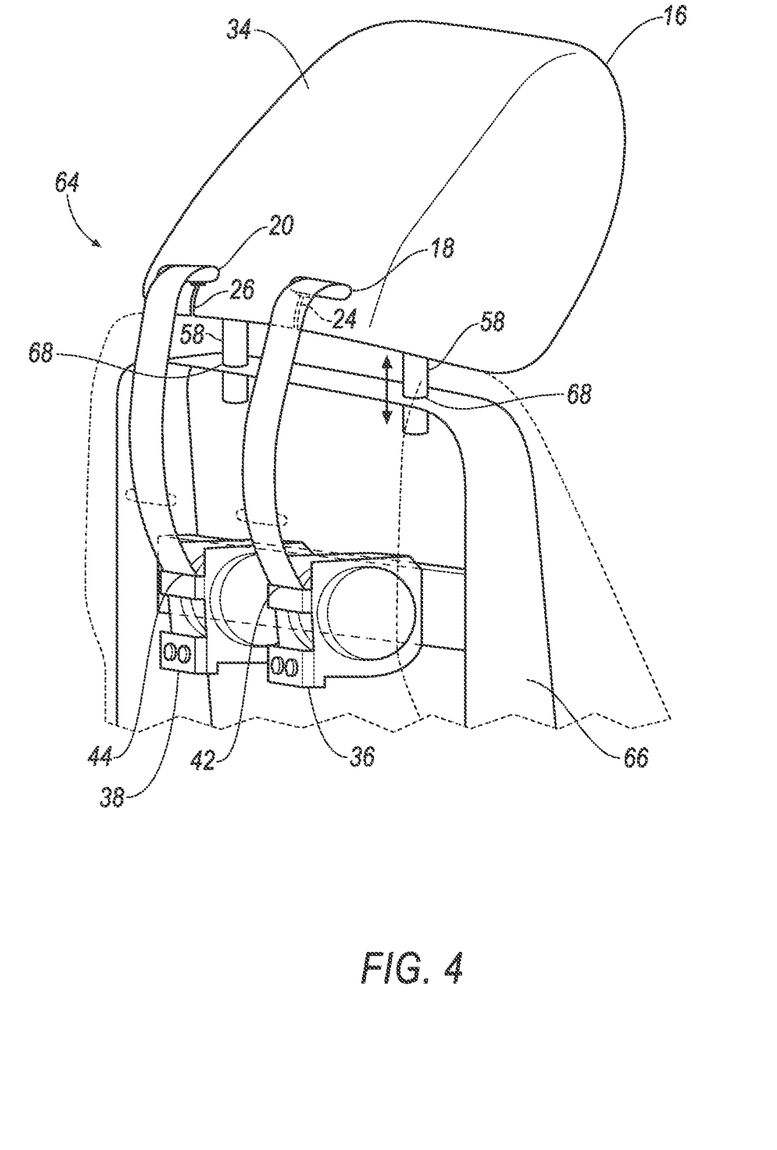
FIG. 4 is a perspective view of a portion of the seat assembly with one embodiment of the seat belt assembly including two retractors mounted to the seat assembly.
Figure 5:
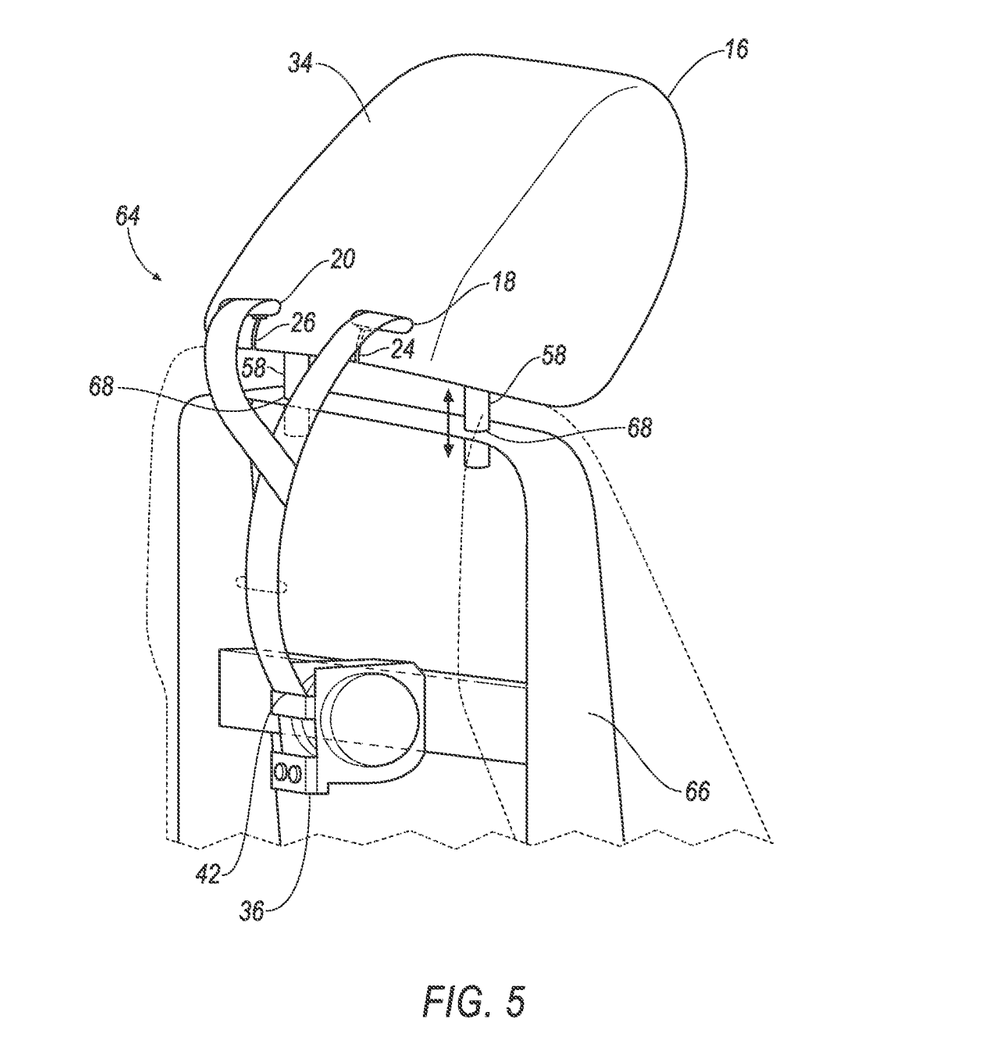
FIG. 5 is a perspective view of a portion of the seat assembly with another embodiment of the seatbelt assembly including one retractor.

As shown in FIGS. 4 and 5, the seat back 12 may include a frame 66 and upholstery, foam, fabric, etc. supported on the frame 66. The frame 66 may be formed from metal, plastic, fiber-reinforced composite materials, etc.

The headrest 16 is adjustable relative to the seat back 12, i.e., adjustable along a longitudinal axis of the seat back 12. In other words, for example, when the seat back 12 is upright, the headrest 16 is adjustable vertically relative to the seat back 12. With reference to FIGS. 3A-3B, the headrest 16 may be lowered to accommodate a relatively shorter occupant, as shown in FIG. 3A, and may be raised to accommodate a relatively taller occupant, as shown in FIG. 3B.

Figure 6:
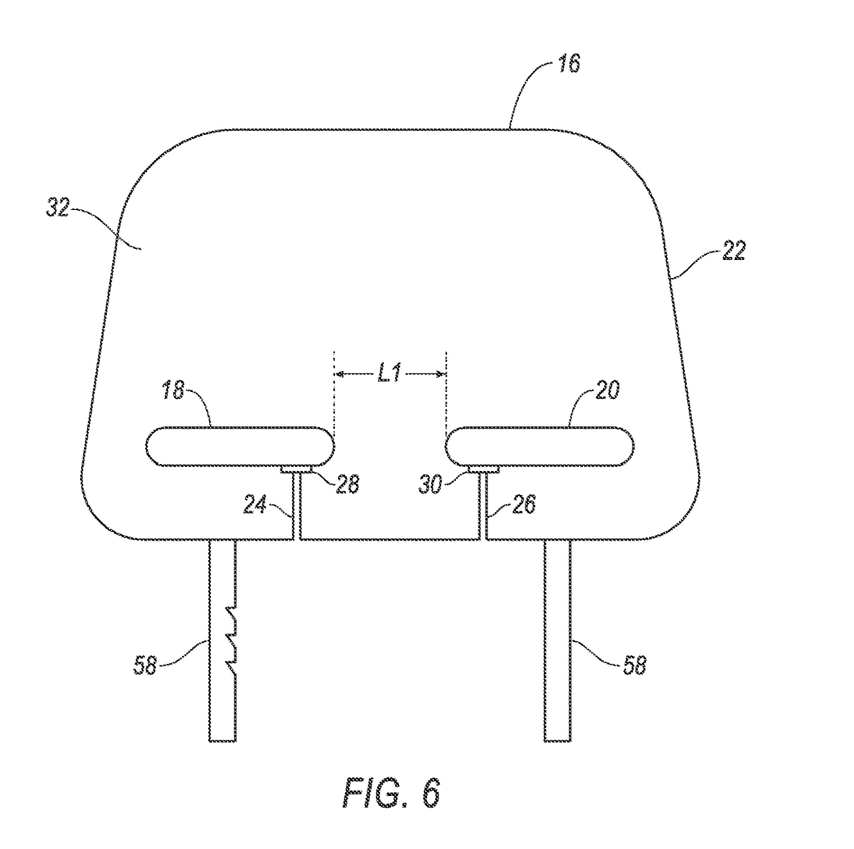
FIG. 6 is a front view of the headrest of the seat assembly.
Figure 7:
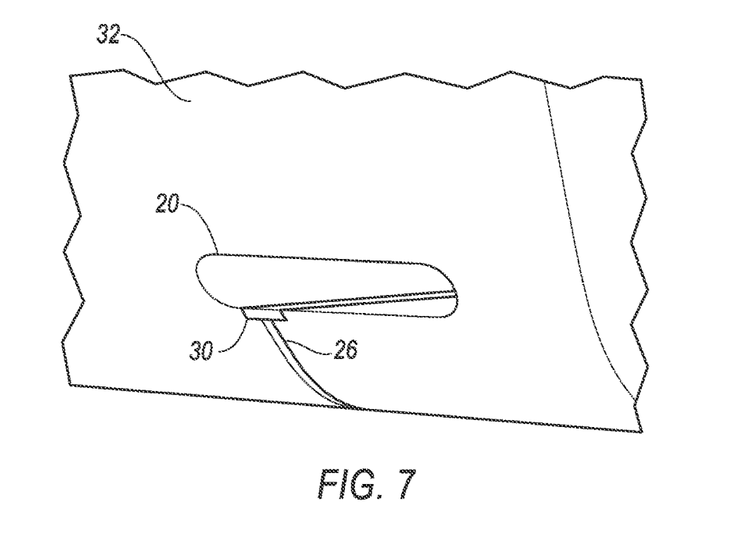
FIG. 7 is a perspective view of a portion of the headrest.

With reference to FIGS. 4-6, the headrest 16 may include two rods 58, and the seat back 12, e.g., the frame 66, may include two holes 68 adjustably receiving the rods 58. Alternatively, the seat back 12 may include the rods 58, and the headrest 16 may include holes 68 adjustably receiving the rods 58. The rods 58 may be adjustable relative to the holes 68 in any suitable fashion. As one example, the seat back 12 may include a lock (not shown), e.g., a clamp, and at least one of the rods 58 may include a plurality of notches (not numbered). The lock may releasably engage the notches, i.e., may engage the notches to lock the rods 58 relative to the seat back 12 and may release the notches to unlock the rods 58 relative to the seat back 12. The features that allow the headrest 16 to be adjustable relative to the seat back 12, e.g., the rods 58 and the holes 68, and the features that allow the headrest 16 to be locked relative to the seat back 12, e.g., the lock and notches described above, may be of any well-known type.

The seat assembly 10 includes a seat belt assembly 64. The seat belt assembly 64 includes the retractor 36 and the belt 40. As set forth further below, the seat belt assembly 64 includes clips 48 and buckles 50.

In one example, as shown in FIG. 4, the seat belt assembly 64 of the seat assembly 10 may include the retractor 36 and a second retractor 38 each fixed to the seat back 12, e.g., the frame 66. In this configuration, the first end 42 of the belt 40 is engaged with the retractor 36, and the second end 44 of the belt 40 is engaged with the second retractor 38. The belt 40 may retractably extend from the retractor 36 at the first end 42, e.g., and pulled through the first guide passage 18, and the belt 40 may retractably extend from the second retractor 38 at the second end 44, e.g., and pulled through the second guide passage 20.

The retractor 36 and the second retractor 38 may each operate in a locked state and an unlocked state. In the locked state, the retractor 36/second retractor 38 locks the belt 40 to prevent it from extending from the retractor 36/second retractor 38. For example, the retractor 36 and the second retractor 38 may operate in the locked state during sudden decelerations of the vehicle 60. In the unlocked state, the belt 40 is selectively extendable from the retractor 36 and the second retractor 38. For example, the retractor 36 and the second retractor 38 may operate in the unlocked state by default. The retractor 36 and the second retractor 38 may independently move between the locked state and the unlocked state. In other words, the retractor 36 may move between the locked state and the unlocked state independently of the second retractor 38, and the second retractor 38 may move between the locked state and the unlocked state independently of the retractor 36.

In another example, as shown in FIG. 5, the seat belt assembly 64 of the seat assembly 10 includes the retractor 36, which may be fixed to the seat back 12, e.g., the frame 66. In this configuration, the first end 42 of the belt 40 is engaged with the retractor 36, and the second end 44 of the belt 40 is connected, e.g., stitched, to a portion of the belt 40 spaced from the first end 42.

With reference to FIGS. 3A-5, the headrest 16 has a front 32 and a back 34. Specifically, the front 32 faces a vehicle-forward direction, and the back 34 faces a vehicle-rearward direction, when the seat assembly 10 is in a non-rotated position. The first guide passage 18 and the second guide passage 20 extend through the headrest 16 from the front 32 to the back 34. In other words, the first guide passage 18 and the second guide passage 20 extend in a vehicle fore-and-aft direction.

The headrest 16 may define a first slit 24 and a second slit 26 providing access to the first guide passage 18 and the second guide passage 20, respectively. Specifically, the headrest 16 has a perimeter 22, and the first slit 24 may extend from the perimeter 22 to the first guide passage 18, and the second slit 26 may extend from the perimeter 22 to the second guide passage 20.

The headrest 16 may include a first cap 28 and a second cap 30. The first cap 28 may extend across the first slit 24, and the second cap 30 may extend across the second slit 26. Specifically, the first cap 28 is fixed to the rest of the headrest 16 in the first slit 24, and the second cap 30 is fixed to the rest of the headrest 16 in the second slit 26. The first cap 28 and the second cap 30 may be fixed to the rest of the headrest 16 in any suitable fashion, e.g., adhesive, stitching, etc. Prior to fixing the first cap 28 and the second cap 30 to the rest of the headrest 16, the belt 40 may be inserted through the first slit 24 to the first guide passage 18, and through the second slit 26 to the second guide passage 20. The first cap 28 and the second cap 30 are then fixed to the rest of the headrest 16 in the first slit 24 and the second slit 26, respectively, to retain the belt 40 in the first guide passage 18 and the second guide passage 20.

As set forth above, the belt 40 extends continuously from the first end 42 to the second end 44. In other words, the belt 40 is not separable along a longitudinal axis of the belt 40, e.g., does not include clips or other releasable fasteners that allow the belt 40 to be separated into segments along the longitudinal axis. The belt 40 may be integral from the first end 42 to the second end 44, i.e., a one-piece unit formed in a single manufacturing process. Alternatively, the belt 40 may be formed from multiple components formed separately and subsequently permanently attached together. The belt 40, for example, may be formed of a woven fabric, such as woven nylon. As one example, the belt 40 is one-piece woven nylon extending from the first end 42 to the second end 44.

Figure 2:
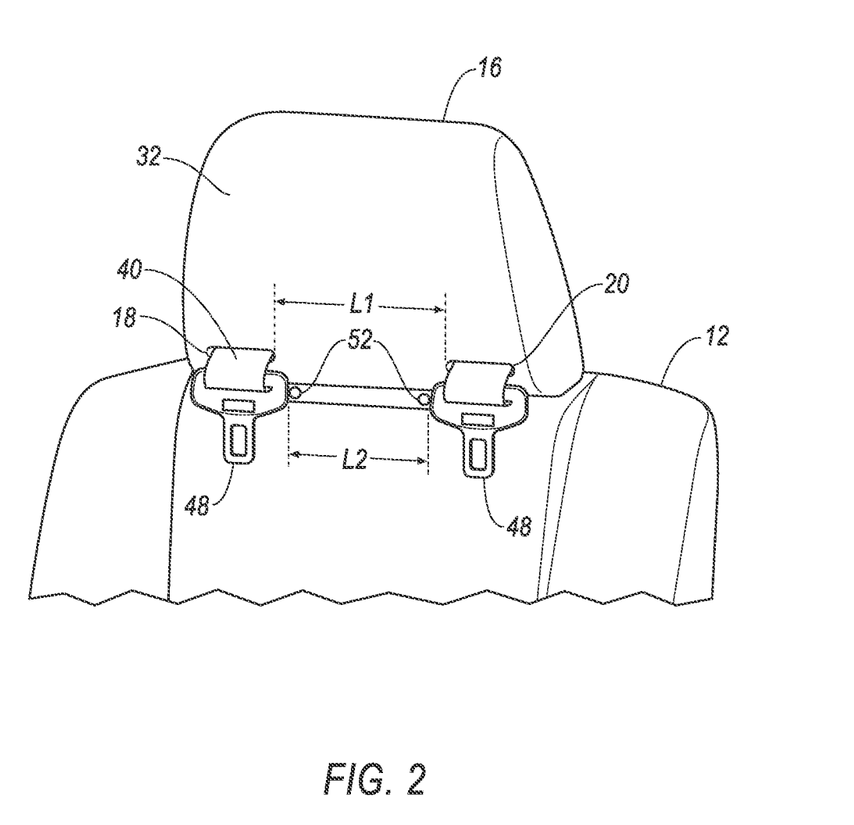
FIG. 2 is a perspective view of a portion of one seat assembly with the seat belt assembly in an unbuckled position.

With reference to FIGS. 2-3B, the looped portion 46 of the belt 40 is disposed at the front 32 of the headrest 16. Specifically, the looped portion 46 extends across the front 32 of the headrest 16 from the first guide passage 18 to the second guide passage 20. In the example shown in FIG. 4, a portion of the belt 40 extends from the looped portion 46 through the first guide passage 18 to the retractor 36, and a portion of the belt 40 extends from the looped portion 46 through the second guide passage 20 to the second retractor 38. In the example shown in FIG. 5, a portion of the belt 40 extends from the looped portion 46 through the first guide passage 18 to the retractor 36, and a portion of the belt 40 extends from the looped portion 46 through the second guide passage 20 to the portion of the belt 40 extending from first guide passage 18 to the retractor 36, as described above. In other words, the looped portion 46 is variable in length as the belt 40 is paid out of the retractor 36 and the second retractor 38 (or just the retractor 36 in the example shown in FIG. 5) and pulled through the first guide passage 18 and the second guide passage 20.

In both of the examples shown in FIGS. 4 and 5, the first guide passage 18 and the second guide passage 20 of the headrest 16 support the looped portion 46. Accordingly, when the headrest 16 is adjusted relative to the seat back 12, as described above, the headrest 16 adjusts the looped portion 46 relative to the seat back 12. In other words, when the headrest 16 is lowered relative to the seat back 12, the looped portion 46 is also lowered relative to the seat back 12, and the retractor 36 and second retractor 38 (or just the retractor 36 in the example of FIG. 5) retract slack in the belt 40. When the headrest 16 is raised relative to the seat back 12, the looped portion 46 is also raised relative to the seat back 12, and the retractor 36 and second retractor 38 (or just the retractor 36 in the example of FIG. 5) pay out the belt 40.

Since the looped portion 46 is supported by the headrest 16, the position of the looped portion 46 is adjustable, along with the headrest 16, to locate the looped portion 46 in a proper position based on the size of the occupant. The simultaneous adjustment of the headrest 16 and the looped portion 46 relative to the seat back 12 allows for both the headrest 16 and the looped portion 46 to be properly located by merely adjusting the headrest 16 to accommodate the size of the occupant.

With reference to FIGS. 2-3B, the seat belt assembly 64 of the seat assembly 10 includes the clips 48. The clips 48 are slidably engaged with the looped portion 46, i.e., are at the front 32 of the headrest 16. The seat belt assembly 64 includes two clips 48.

With reference to FIGS. 3A-3B, the seat belt assembly 64 includes the buckles 50 fixed relative to the seat bottom 14. For example, the buckles 50 may be fixed directly to the seat bottom 14, as shown in FIGS. 3A-3B. As another, example, the buckles 50 may be fixed to the body of the vehicle 60.

The buckles 50 may be releasably engageable with the pair of clips 48. For example, the clips 48 and the buckles 50 may operate in an engaged state as shown in FIGS. 3A-3B and a disengaged state as shown in FIG. 2. In the engaged state, the belt 40 may form a four-point harness, meaning that the belt 40 has four points of contact with the seat assembly 10, i.e., the first guide passage 18, the second guide passage 20, and the pair of buckles 50.

With reference to FIG. 2, the seat belt assembly 64 may include two buttons 52 attached to the belt 40, i.e., fixed to the belt 40. The buttons 52 are spaced from each other and are both disposed between both of the clips 48. The buttons 52 space the clips 48 from each other. The buttons 52 are dimensioned to prevent the clips 48 from sliding past the buttons 52.

As shown in FIGS. 2 and 6, the first guide passage 18 and the second guide passage 20 have ends spaced from each other by a first length L1, and the buttons 52 may be spaced from each other along the belt 40 by a second length L2. As shown in FIG. 2, the second length L2 is less than the first length L1. Since the second length L2 is less than the first length L1, the buttons 52 pull the clips 48 against the headrest 16 when the retractor 36 and the second retractor 38 (or just the retractor 36 in the example shown in FIG. 5) retract the belt 40. The retractor 36 and the second retractor 38 (or just the retractor 36 in the example shown in FIG. 5) releasably hold the clips 48 against the headrest 16, as shown in FIG. 2. After positioning the headrest 16, when seated, the occupant may pull the looped portion 46 and the clips 48 over the head of the occupant and may engage the clips 48 with the buckles 50, as shown in FIGS. 3A and 3B.

Figure 8:
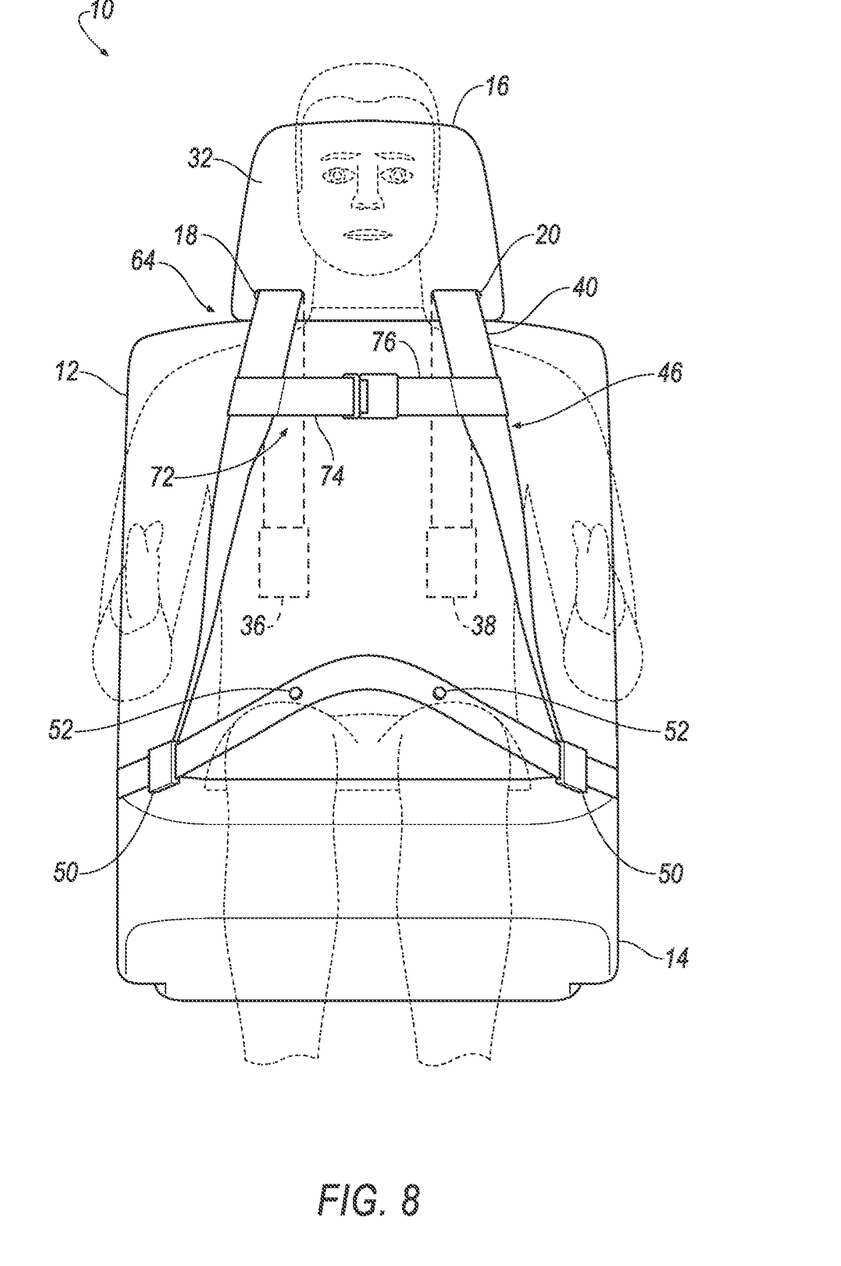
FIG. 8 is a front view of one seat assembly including a seat belt assembly having a chest clip.
Figure 9:
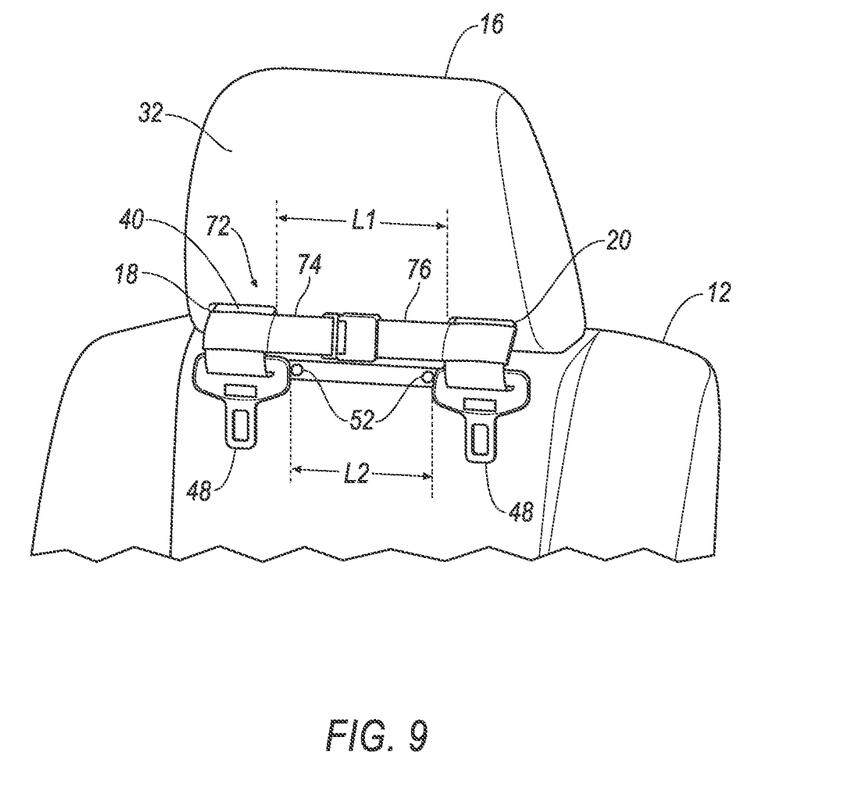
FIG. 9 is a perspective view of a portion of one seat assembly in the unbuckled position and having the chest clip.

As shown in FIGS. 8 and 9, the seat belt assembly 64 may include a chest clip 72 slidably engaged with the looped portion 46. Specifically, the chest clip 72 may include a first member 74 and a second member 76 each independently slidable along the looped portion 46. For example, the first member 74 and the second member 76 may each include a loop (not numbered) that receives the looped portion 46. When the clips 48 are engaged with the buckles 50, the loop of the first member 74 allows the first member 74 to slide along the looped portion 46 from the first guide passage 18 to one of the clips 48, and the loop of the second member 76 allows the second member 76 to slide along the looped portion 46 from the second guide passage 20 to the other of the clips 48. The feature that allows the first member 74 and the second member 76 to slide along the looped portion 46, e.g., the loop described above, may be of any well-known type. The first member 74 and the second member 76 are releasably engageable with each other. For example, as shown in FIGS. 8 and 9, the first member 74 may include a male attachment and the second member 76 may include a female attachment releasably engageable with the female attachment, e.g., an engagement mechanism such as a side release buckle, a top release buckle, or any suitable engagement mechanism. Alternatively, the second member 76 may include a male attachment and the first member 74 may be a female attachment.

The first member 74 is positioned along the looped portion 46 between one of the clips 48 and the first guide passage 18, and the second member 76 is positioned along the looped portion 46 between the other of the clips 48 and the second guide passage 20. Specifically, one of the clips 48 is disposed along the looped portion 46 between the first member 74 and one of the buttons 52, and the other of the clips 48 is disposed along the looped portion 46 between the second member 76 and the other of the buttons 52. Accordingly, as shown in FIG. 9, when the clips 48 are disengaged from the buckles 50, the retractor 36 and the second retractor 38 (or just the retractor 36 in the example shown in FIG. 5) retract the belt 40, which results in one of the buttons 52 pulling one of the clips 48 and the first member 74 against the first guide passage 18, and in the other of the buttons 52 pulling the other of the clips 48 and the second member 76 against the second guide passage 20. In other words, one of the buttons 52 sandwiches one of the clips 48 and the first member 74 between the button 52 and the first guide passage 18, and the other of the buttons 52 sandwiches one of the clips 48 and the second member 76 between the button 52 and the second guide passage 20.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A seat assembly comprising:
   a seat back;
   a headrest adjustably coupled to the seat back, the headrest defining a first guide passage and a second guide passage each extending through the headrest;
   a retractor;
   a belt extending continuously from a first end to a second end, the first end engaged with the retractor, the belt having a looped portion from the first guide passage to the second guide passage, the belt extending from the looped portion through the first guide passage to the first end and extending from the looped portion through the second guide passage to the second end;

a pair of clips slidably engaged with the looped portion; and a pair of buckles releasably engageable with the pair of clips.

2. The seat assembly of claim 1, wherein the headrest has a perimeter and defines a first slit and a second slit, the first slit extending from the perimeter to the first guide passage, and the second slit extending from the perimeter to the second guide passage.

3. The seat assembly of claim 2, wherein the headrest further comprises a first cap extending across the first slit and a second cap extending across the second slit.

4. The seat assembly of claim 1, wherein the headrest has a front and a back, the first guide passage and the second guide passage extending through the headrest from the front to the back.

5. The seat assembly of claim 1, further comprising a seat bottom supporting the seat back, the seat bottom being designed to rotatably connect to a floor of a vehicle.

6. The seat assembly of claim 1, further comprising a second retractor, the second end of the belt being engaged with the second retractor.

7. The seat assembly of claim 6, wherein the retractor and the second retractor are fixed to the seat back.

8. The seat assembly of claim 6, wherein the looped portion of the belt is disposed at a front of the headrest and extends from the first guide passage to the second guide passage, the belt extends from the looped portion through the first guide passage to the retractor, and the belt extends from the looped portion through the second guide passage to the second retractor.

9. The seat assembly of claim 1, wherein the second end of the belt is connected to a portion of the belt spaced from the first end.

10. The seat assembly of claim 9, wherein the retractor is fixed to the seat back.

11. The seat assembly of claim 1, further comprising two buttons attached to the belt between the pair of clips and spaced from each other, the first guide passage and the second guide passage having ends spaced from each other by a first length, and the buttons being spaced from each other along the belt by a second length less than the first length.

12. The seat assembly of claim 1, further comprising a seat bottom supporting the seat back, the buckles being fixed to the seat bottom.

13. A vehicle comprising:
a floor;
a seat assembly having a seat bottom rotatably coupled to the floor and a seat back supported by the seat bottom;
the seat assembly including a headrest adjustably coupled to the seat back, the headrest defining a first guide passage and a second guide passage each extending through the headrest;
a retractor; and
a belt extending continuously from a first end to a second end, the first end engaged with the retractor, the belt having a looped portion from the first guide passage to the second guide passage, the belt extending from the looped portion through the first guide passage to the first end and extending from the looped portion through the second guide passage to the second end.

14. The vehicle of claim 13, wherein the retractor is fixed to the seat back.

15. The vehicle of claim 13, wherein the headrest has a perimeter and defines a first slit and a second slit, the first slit extending from the perimeter to the first guide passage, and the second slit extending from the perimeter to the second guide passage.

16. The vehicle of claim 15, wherein the headrest further comprises a first cap extending across the first slit and a second cap extending across the second slit.

17. A seat assembly comprising:
a seat back;
a headrest adjustably coupled to the seat back, the headrest defining a first guide passage and a second guide passage each extending through the headrest;
a retractor;
a belt extending continuously from a first end to a second end, the first end engaged with the retractor, the belt having a looped portion from the first guide passage to the second guide passage, the belt extending from the looped portion through the first guide passage to the first end and extending from the looped portion through the second guide passage to the second end;
a pair of clips slidably engaged with the looped portion; and
two buttons attached to the belt between the pair of clips and spaced from each other, the first guide passage and the second guide passage having ends spaced from each other by a first length, and the buttons being spaced from each other along the belt by a second length less than the first length.

18. The seat assembly of claim 17, further comprising a pair of buckles releasably engageable with the pair of clips.

19. The seat assembly of claim 17, wherein the headrest has a perimeter and defines a first slit and a second slit, the first slit extending from the perimeter to the first guide passage, and the second slit extending from the perimeter to the second guide passage.

20. The seat assembly of claim 19, wherein the headrest further comprises a first cap extending across the first slit and a second cap extending across the second slit.

* * * * *